United States Patent [19]

Anderson et al.

[11] 4,406,379
[45] Sep. 27, 1983

[54] CABLE MANAGER

[75] Inventors: William C. Anderson, Grand Rapids; Raoul J. P. Schoumaker, Wyoming, both of Mich.

[73] Assignee: Westinghouse Electric Corp., Pittsburgh, Pa.

[21] Appl. No.: 387,639

[22] Filed: Jun. 11, 1982

[51] Int. Cl.³ .............................................. B65D 43/24
[52] U.S. Cl. .................................... 220/335; 138/156; 220/337; 220/338
[58] Field of Search ............... 220/335, 337, 338, 128; 138/156, 106; 248/243, 73; 174/48, 49

[56] References Cited

U.S. PATENT DOCUMENTS

| 2,654,503 | 10/1953 | Parsell ................................. 220/335 |
| 2,882,633 | 4/1959 | Howell ................................. 40/156 |
| 3,759,297 | 9/1973 | Anderson et al. ..................... 138/156 |
| 4,094,561 | 6/1978 | Wolff et al. ......................... 312/223 |
| 4,296,981 | 10/1981 | Hildebrandt et al. ............... 312/194 |
| 4,345,697 | 8/1982 | Wilson et al. ....................... 220/335 |

Primary Examiner—George T. Hall
Attorney, Agent, or Firm—B. R. Studebaker

[57] ABSTRACT

A cable manager for concealing and controlling electrical and telephone cables in an office environment is disclosed. The cable manager includes a base housing member and a hinged top closure member. A plurality of leaf springs releasably retain the top closure in either the open or closed position and hidden access to the interior of the closed cable manager is provided along its entire length.

11 Claims, 7 Drawing Figures

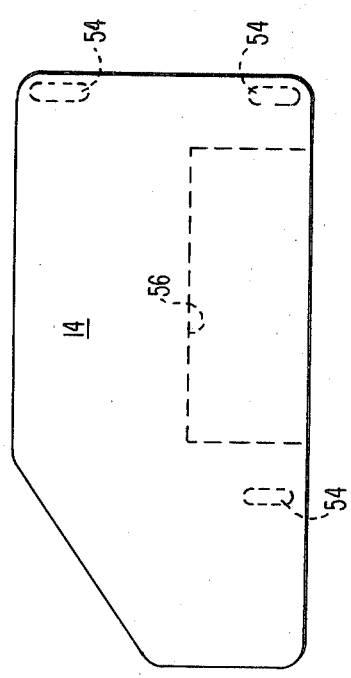
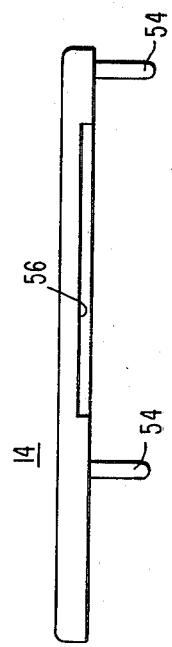

CABLE MANAGER

BACKGROUND OF THE INVENTION

In conventional wall to ceiling partitioned offices the electrical and telephone wiring was generally located in the permanent wall structures and therefore concealing and controlling wiring for telephones, dictaphones, calculators and similar office equipment was not a significant problem. With the increasing use of the open office plan, wherein offices are defined by a system of movable partitions that in general do not reach the ceiling, there has been a problem of controlling and conealing electrical wiring. Additionally, the use of electrical power at work stations in the modern office is increasing significantly with the use of computer terminals and electronic word processing equipment.

In the early stages of the open office plan wire managers of the type disclosed in U.S. Pat. No. 3,759,297 to W. C. Anderson et al. were employed to mount the cables and wiring directly to the wall panel systems in an effort to both control and conceal the wiring. As the open office plan evolved it was determined that maintaining the wiring permanently within the wall panel system was desirable and a second generation of wall panel systems evolved known as the power panel in which the baseboard of the wall panel permanently or removably enclosed the electrical wiring for the panel system. One such system is disclosed in U.S. Pat. No. 4,278,834 to B. K. Boundy. Further evolution of the open office plan system indicated that utilization of electrical power was not necessarily always directly adjacent the wall panel and additional systems were devised to control and conceal electrical wiring at and along the user's desk or work station. Two examples of desk mounted wiring systems are disclosed in U.S. Pat. No. 4,094,561 to D. F. Wolff et al. and U.S. Pat. No. 4,296,981 to N. Hildebrandt et al.

Since in some instances the power cables must be carried by the wall system and in others they must be carried by the actual desk or work station a simple, aesthetically appealing universal cable manager which is adapted for use both on a space dividing wall panel as well as the work surface has become increasingly desirable.

SUMMARY OF THE INVENTION

In accordance with the present invention a cable manager has been devised for concealing and controlling electrical cables which does not detract from the office appearance and is versatile enough to be carried either by a wall panel or a work surface and in that regard either on top of the work surface or beneath the work surface.

The cable manager of this invention includes an elongated base member having a bottom wall, a rear wall and a first front wall substantially shorter than the rear wall. The rear wall terminates at its upper end in a C-shaped socket extending inwardly and overlying the bottom wall. An elongated top closure member having hinge means at one end thereof and stop means on each side of the hinge means is interconnected to the base portion by the hinge member coacting with the C-shaped socket for rotational movement therein. The elongated top closure extends beyond the front wall and includes a downwardly extending second front wall that terminates in a spaced relationship with the first front wall when the top closure is in a closed position. Spring means interconnect the bottom wall and the top closure, the spring means is constructed and arranged to releasably retain the top closure in either a closed or open position. The stop means adjacent the hinge means coact with the C-shaped socket to limit the open and closed position of the top closure and the spring means is preferably a plurality of individual leaf springs having a predetermined spacing therebetween. End caps or closures are secured to each end of the elongated base member and close off the ends of the cable manager. These end caps are adapted to include hook-shaped connectors which extend laterally of the base portion in order that the cable manager may be supported from a conventional slotted standard.

BRIEF DESCRIPTION OF THE DRAWING

Many of the attendant advantages of the present invention will become more readily apparent and better understood as the following detailed description is considered in connection with the accompanying drawing in which:

FIG. 6 is a side elevation view of the end cap of the cable manager of this invention; and FIG. 7 is a bottom plan view of said end cap.

DESCRIPTION OF THE PREFERRED EMBODIMENT

Figure 1:
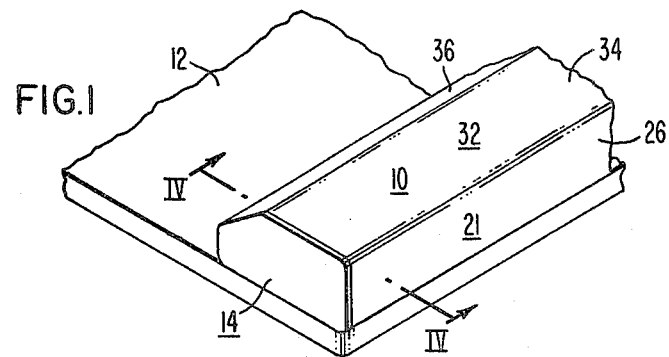
FIG. 1 is a perspective view of the cable manager of this invention situated on the top of a work surface.
Figure 2:
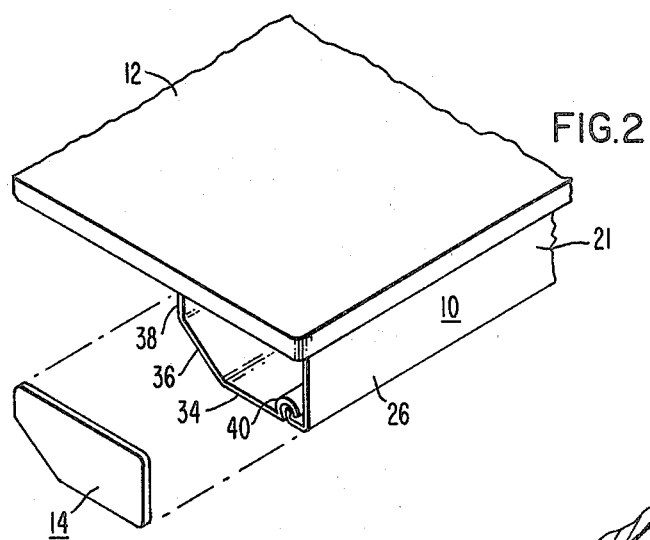
FIG. 2 is a perspective view of the cable manager secured beneath a work surface.
Figure 3:
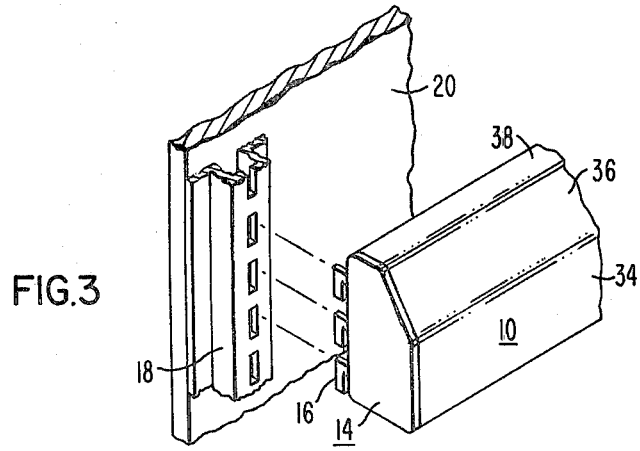
FIG. 3 is a perspective view of the cable manager illustrating the mounting of the cable manager to a vertical wall panel.

Referring now in detail to the drawings wherein like reference characters represent like parts throughout the several views there is illustrated in FIGS. 1 through 3 the various locations in which the cable manager, generally designated 10, can be utilized. In FIG. 1 the cable manager 10 is situated adjacent one edge of a work surface 12 and can be either free standing on the work surface or may be secured thereto by cementing directly to the work surface or by mechanical means such as screws or bolts. In FIG. 2 the cable manager is mounted to the underside of the work surface 12 and again can be secured thereto by cement or mechanical fastening means as desired. In FIG. 3 the cable manager of this invention includes associated with its end cap 14 a plurality of hook-shaped connectors 16 which are constructed and arranged to connect to a conventional slotted standard 18 on a space-dividing wall panel 20.

Figure 4:
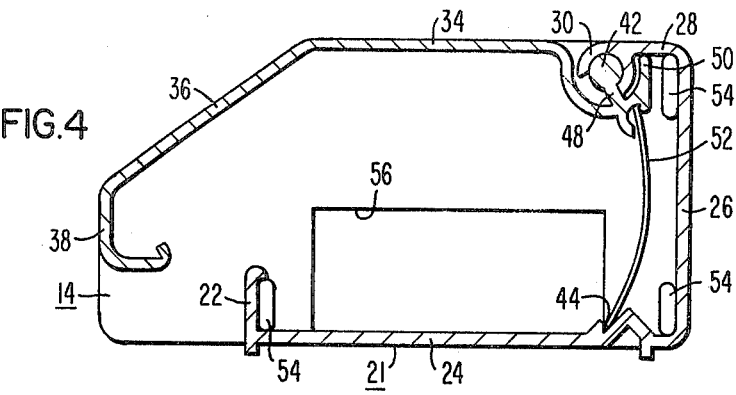
FIG. 4 is a sectional view of the cable manager of this invention taken along the line IV—IV of FIG. 1.
Figure 5:
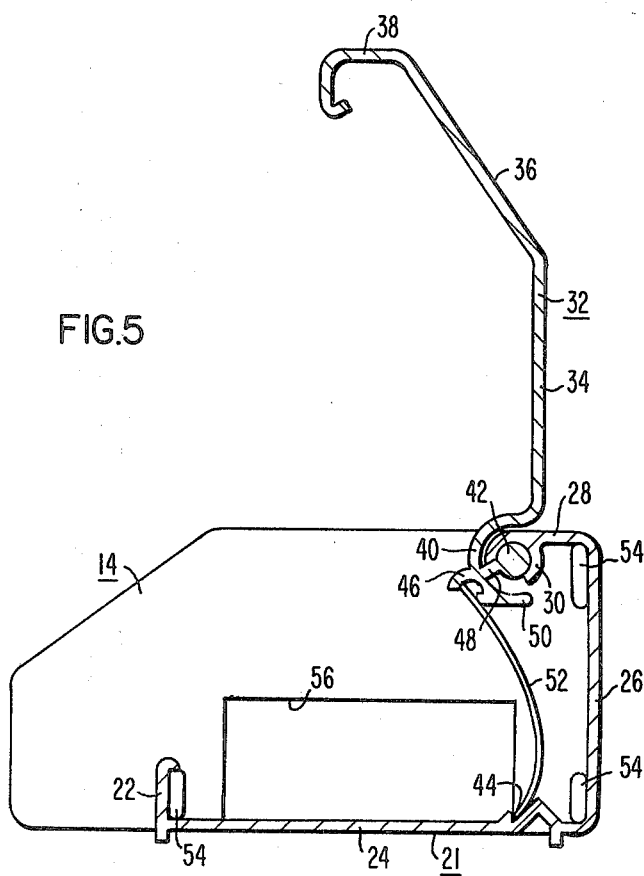
FIG. 5 is a sectional view similar to FIG. 4 with the top closure illustrated in an open position.

Referring now to FIGS. 4 and 5 the specific embodiment of the cable manager of this invention includes a base portion or member 21 having a short front wall 22, a bottom wall 24 and a rear wall 26. The rear wall 26 includes an upper extension or shortened top wall 28 which includes a C-shaped hinge means 30 which extends for the length of the cable manager.

The top wal or top closure 32 includes an upper planar surface 34 and a sloped front portion 36, of substantially the same width of the planar portion 34, which terminates in a short downwardly directed front wall 38. At the side of the top closure opposite the short front wall 38 is an elongated cylindrical groove 40 which carries at its center an elongated cylindrical pivot member or hinge in the form of rib 42 which fits into the C-shaped hinge member 30 on the upper extension 28 of the rear wall 26 to form a hinged connection between the top cover 32 and the base member 21 of the cable manager.

The bottom wall 24 is provided with a spring retaining groove 44 and the underside of the cylindrical groove 40 in the top closure 32 is also provided with an elongated C-shaped spring retaining groove or slot 46. The elongated cylindrical rib 42 is supported within the cylindrical groove 40 by a neck member 48 which coacts with the end edges of the C-shaped hinge member 30 on the rear extension 28 to form stop members which limit the open and closed positions of the top closure member 32. Additional stop means are provided in the form of extension 50 on the cylindrical groove 40 which coacts with the underside of the rear wall extension 28 to maintain the planar portion 34 of the top closure in a horizontal position when the top closure is in its closed position. A plurality of leaf springs 52 are disposed between the spring retaining groove 44 and the C-shaped slot 46 in the top closure to releasably retain the top closure 34 in either the closed position as illustrated in FIG. 4 or the fully open position as illustrated in FIG. 5.

As will be seen, because the lateral width of the planar portion 34 and the sloped portion 36 of the top closure, the top closure is substantially greater in width than the width of the bottom wall 24 thus providing access space between the front wall 38 of the top closure and the short front wall 22 of the base member. This access space or opening is hidden from view when the cable manager top closure is in a normally closed position but will still provide exit or entrance capabilities along the entire length of the cable manager for the entrance or exit of the electrical wiring from the desk operated equipment.

The ends of the elongated cable manager are closed off by end caps 14 which are best illustrated in FIGS. 6 and 7. The end caps 14 are shaped to enclose the entire cable manager when viewed from the end and include three detent extensions 54 extending from its inner surface. The detent extensions 54 fit snugly against the front wall 22 and rear wall 26 of the base member and are preferably cemented thereto to permanently close off the ends of the cable manager. Additionally, the end caps include a rectangular recess or cutout portion 56 on the inner surface which is adapted to accommodate a clip of hook connectors 16 in the event it is desired to hang the cable manager from a space dividing wall panel as illustrated in FIG. 3. The hook connector clip may be cemented to the interior surface of the end cap or may be secured thereto by a mechanical means such as screws.

The cable manager of this invention preferably consists of two elongated aluminum extrusions but the base member and the top closure could be made from rigid plastic if desired. The end caps 14 are preferably of rigid plastic and it is also preferred that the plurality of leaf springs 52 be about one inch in width and be spaced approximately fifteen inches apart along the length of the cable manager in order to provide releasable retention of the top cover in both its open and closed position.

As will be apparent from the foregoing the wire manager of this invention can be mounted either on top of a work surface or under it, it can also be mounted to a space dividing wall panel slotted standard if desired. In the closed position, there is hidden access space available at the front of the cable manager to allow the entrance or exit of cables at any point along the entire length of the cable manager.

What is claimed is:

1. A cable manager for concealing and controlling electrical and telephone cables in an office environment, said cable manager comprising:

an elongated base member including a bottom wall, a rear wall and a first front wall substantially shorter than said rear wall, said rear wall terminating in a C-shaped socket extending inwardly and overlying said bottom wall;

an elongated top closure member having hinge means at one end thereof and stop means on each side of said hinge means, said hinge means constructed and arranged to be contained within said C-shaped socket on said base portion for rotational movement therein, said elongated top closure extending beyond said first front wall and including a downwardly extending second front wall that terminates in a spaced relationship with said first front wall when said top closure member is in a closed position; and spring means interconnecting said base wall and said top closure, said spring means constructed and arranged to releasably retain said top closure in either a closed or open position.

2. The cable manager according to claim 1 wherein said stop means on each side of said hinge means coact with said C-shaped socket to limit the open and closed position of said top closure.

3. A cable manager according to claim 1 wherein said spring means is a plurality of individual leaf springs having a predetermined spacing therebetween.

4. A cable manager according to claim 1 wherein end cap means are secured to each end of said elongated base member closing off the ends of said cable manager.

5. The cable manager according to claim 4 wherein hook-shaped connectors, secured to said end caps extend laterally from said base member whereby said cable manager may be supported from conventional slotted standards.

6. A cable manager for concealing and controlling electrical and telephone cables in an office environment, said cable manager comprising:

a base housing including a front wall, a base wall and a rear wall, said rear wall terminating in a hinge member at its upper end;

a top closure having a hinge member at one side thereof and a front wall at the other side thereof, said hinge member on said top closure being interconnected to said hinge member on said rear wall of said base housing providing relative pivotal movement of said top closure from an open position to a closed position with respect to said base housing; and spring means interconnecting said base housing and said top cover, said spring means releasably retaining said top closure in its fully open and fully closed positions.

7. The cable manager according to claim 6 wherein a pair of stop means are provided adjacent said hinge member on said top closure, said stop means coacting with said hinge member on said base housing to limit the fully open and fully closed positions of said top closure.

8. The cable manager according to claim 6 wherein said spring means is a plurality of individual leaf springs having a predetermined spacing therebetween.

9. The cable manager according to claim 6 wherein end cap means are secured to each end of said base housing member closing off the ends of said cable manager.

10. The cable manager according to claim 9 wherein hook-shaped connectors, secured to said end caps, extend laterally of said base housing whereby said cable manager may be supported from conventional slotted standards.

11. The cable manager according to claim 6 wherein said front wall on said top closure extends downwardly beyond the upper end of the front wall on said base housing and is spaced laterally therefrom thereby defining a hidden access opening to the interior of said cable manager.

* * * * *